Sept. 2, 1952  R. CHILTON  2,608,839
UNIVERSAL JOINT
Filed March 23, 1948  2 SHEETS—SHEET 1
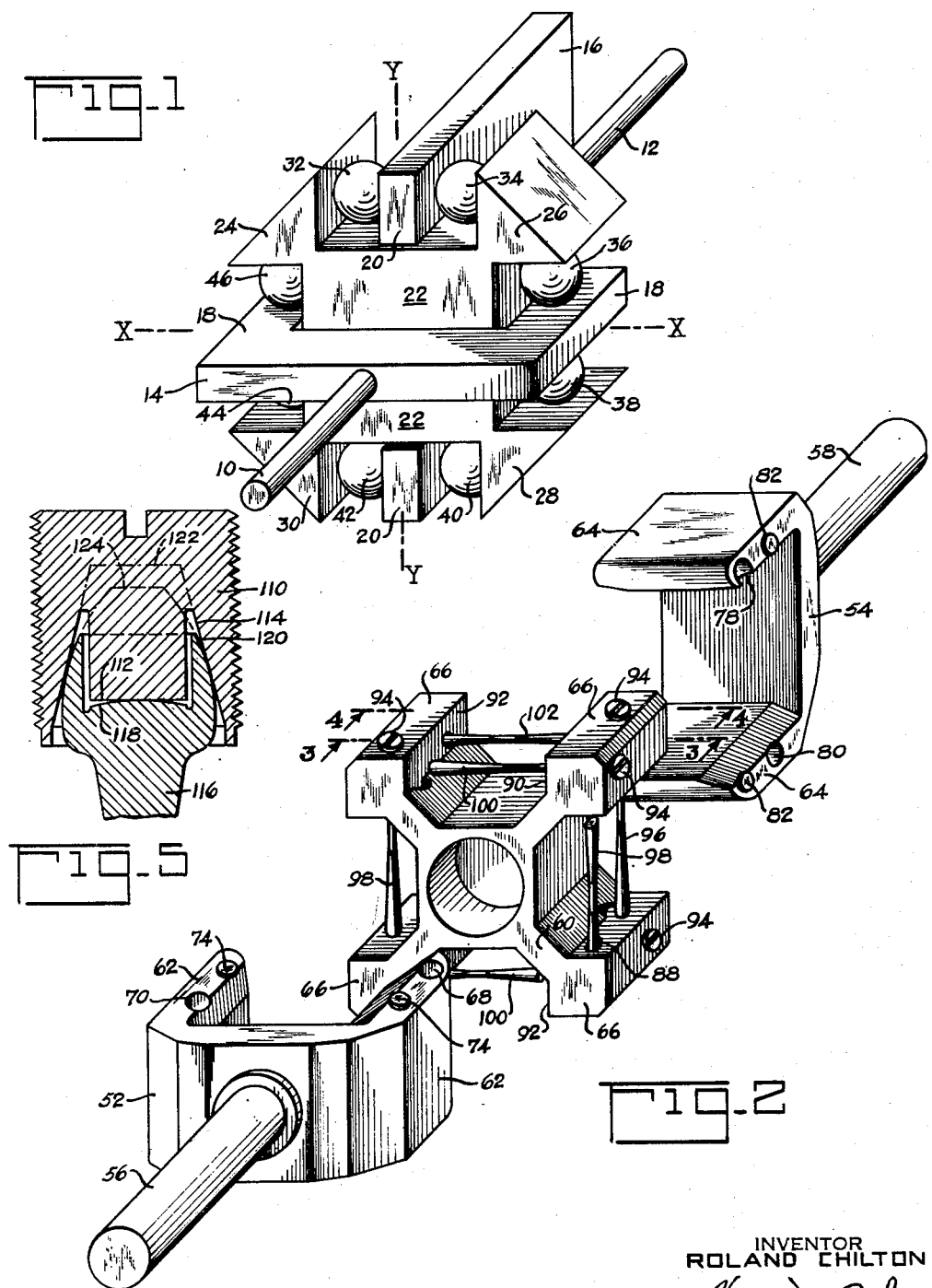
INVENTOR
ROLAND CHILTON
BY Victor D. Behn
ATTORNEY Sept. 2, 1952  R. CHILTON  2,608,839
UNIVERSAL JOINT Filed March 23, 1948  2 SHEETS—SHEET 2

INVENTOR
ROLAND CHILTON.
BY Victor D. Behn
ATTORNEY

Patented Sept. 2, 1952

2,608,839

UNITED STATES PATENT OFFICE 2,608,839

UNIVERSAL JOINT

Roland Chilton, Glen Rock, N. J., assignor to Curtiss-Wright Corporation, a corporation of Delaware Application March 23, 1948, Serial No. 16,450

11 Claims. (Cl. 64—9)

This invention relates to a flexible coupling for a pair of shafts and is particularly directed to a torsionally rigid flexible coupling having three degrees of freedom such that said coupling permits lateral, axial and angular displacement of said shafts relative to each other.

An object of the invention comprises the provision of a novel flexible coupling of compact construction and having the aforementioned three degrees of freedom. A further object of the invention comprises a flexible coupling having said three degrees of freedom and being capable of transmitting large torques, as for a tank transmission. Although the invention has been designed for use with a tank transmission it obviously is of general application.

Specifically, the invention comprises a pair of spherical-ended struts disposed on diametrically opposite sides of the coupling axis. Each of said spherical-ended struts is disposed between a pair of flat parallel surfaces respectively rigid with one of the shafts to be coupled together and with an intermediate coupling member, torque being transmitted in one direction from said one shaft to said intermediate member through said surfaces and the interposed spherical-ended struts. Torque is similarly transmitted from said intermediate member to the other of the shafts to be coupled together through a second pair of diametrically spaced spherical-ended struts, rotatively displaced 90° from said first pair of spherical members. Two additional pairs of spherical-ended struts are provided for transmitting torque in the reverse direction.

Other objects of the invention will become apparent upon reading the annexed detailed description in connection with the drawing, in which:

Figure 1 is a diagrammatic perspective view of a coupling illustrating the mode of operation of the invention;

Figure 2 is an exploded perspective view of a coupling embodying the invention;

Figure 3:
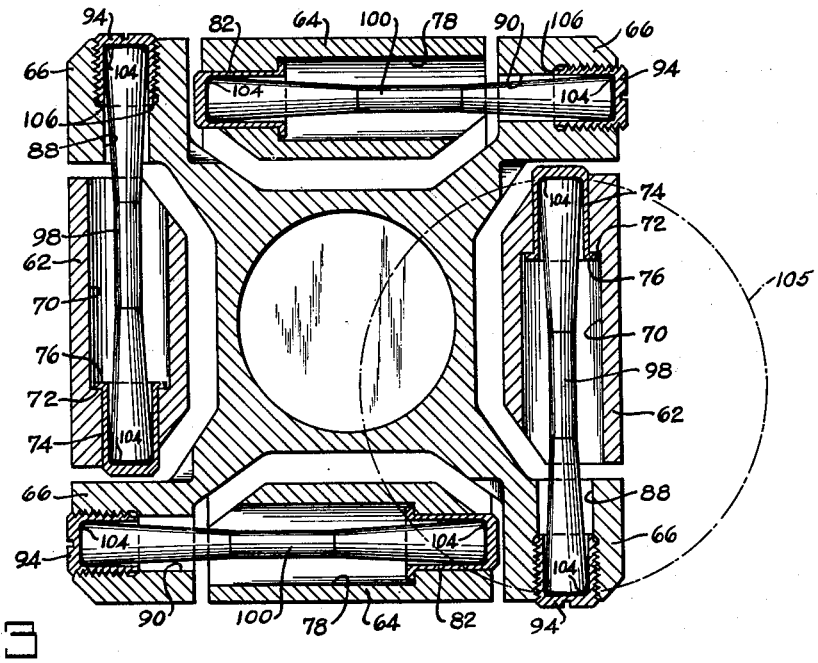
Figure 4:
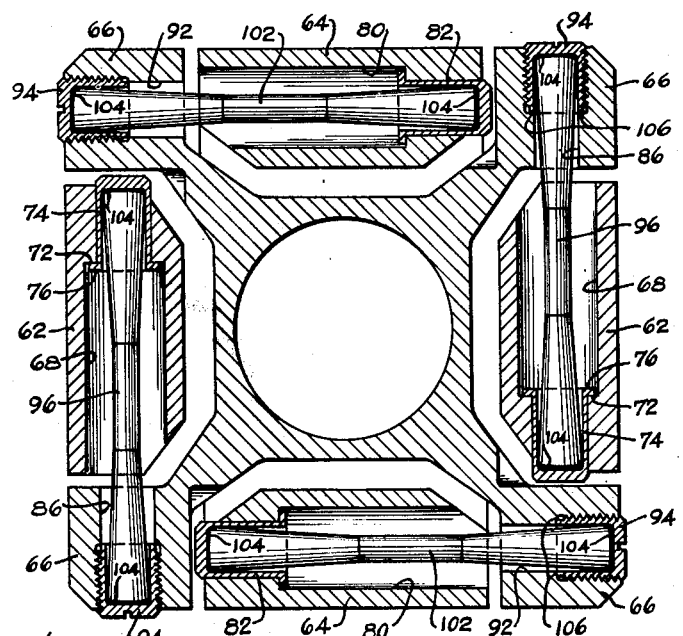

Figures 3 and 4 are sectional views taken along lines 2—2 and 3—3 respectively of Figure 2 but with the coupling completely assembled; and Figure 5 is a partial view of a modification of the coupling of Figures 2 to 4.

The mode of operation of applicant's coupling can best be understood by reference to the diagrammatic showing of Figure 1. This figure illustrates a coupling providing a flexible connection between a pair of shafts 10 and 12. In Figure 1, the coupling comprises a pair of identical flat U-shaped or forked members 14 and 16 connected to the shafts 10 and 12, respectively. The flat U-shaped members 14 and 16 are rotatively displaced 90° relative to each other with their respective flat projecting ends 18 and 20 extending in opposite directions and overlapping an intermediate coupling member 22. The intermediate coupling member 22 is formed with corner portions 24, 26, 28 and 30 having spaces therebetween within which the projecting ends 18 and 20 are disposed. One of spherical balls 32, 34, 36, 38, 40, 42, 44, and 46 is disposed between each said corner portion and the adjacent projecting flat end 18 or 20. The facing surfaces of said corner portions and the projecting ends 18 are flat and disposed parallel to the axis of the intermediate coupling member 22. The facing surfaces of said corner portions and the projecting ends 20 are also flat and disposed parallel to the axis of the intermediate coupling member 20, said latter facing surfaces being disposed at right angles to said first-mentioned facing surfaces.

With this arrangement of Figure 1, the coupling is adapted to transmit clockwise torque from the shaft 10 to the shaft coupling member 14 and thence through the balls 38 and 46 to the intermediate coupling member 22. From the intermediate coupling member 22 said clockwise torque is transmitted through the balls 32 and 40 to the shaft coupling member 16 and thence to the shaft 12. Similarly, the coupling is adapted to transmit counter-clockwise torque from the shaft 10 to the shaft coupling member 14 and thence through the balls 36 and 44 to the intermediate coupling member 22. From the intermediate coupling member 22 said counter-clockwise torque is transmitted through the balls 34 and 42 to the shaft coupling member 16 and thence to the shaft 12. Thus, one set of four balls 32, 38, 40, and 46 with the intermediate coupling member 22 transmits torque in one direction and the other set of four balls 34, 36, 42, and 44 with said intermediate coupling member transmits torque in the other direction. Accordingly, if torque is only to be transmitted in one direction, then one of said sets of balls could be eliminated.

From Figure 1 it is clear that, because of the rolling action of the spherical balls on the flat surfaces engaged thereby, the shaft coupling member 14 may move axially and laterally horizontally relative to the intermediate member 22 and in addition said coupling member 14 may rotate about a vertical axis Y—Y relative to the intermediate coupling member 22. Similarly the shaft coupling member 16 may move axially and laterally vertically relative to the intermediate coupling member 22 as well as rotate about a horizontal axis X—X relative to said intermediate coupling member. Accordingly, the shaft coupling members 14 and 16 are free to move axially, laterally and angularly relative to each other. Such flexing movements of the coupling members result only from the rolling action of the spherical balls on the flat surfaces engaged thereby, the two facing flat surfaces engaged by each spherical ball remaining parallel to each other during all flexing movements of the coupling. Thus, there is no sliding friction between any of the relatively moving parts of the coupling. The magnitude of the relative movements between the coupling members 14, 16 and 22 is obviously limited by the amount of clearance provided between said coupling members. Also, it should be clear from Figure 1, that the coupling is torsionally rigid, that is, that the coupling does not permit relative rotative movement of the shafts 10 and 12 relative to each other about their axis.

With the arrangement of Figure 1, the smaller the spherical balls are made, the higher are the contact stresses on the surfaces engaged by said balls. Accordingly it is desirable that the spherical balls be as large as possible. However, in Figure 1, the overall diameter of the coupling is many times that of its spherical balls, so that the size of these spherical balls is severely limited by the permissible size of the coupling.

Figures 2 to 4 illustrate a coupling generally similar to that of Figure 1 in which a novel arrangement permits the use of torque transmitting spherical surfaces of relatively large radius.

With the arrangement of Figure 1, the torque transmitting spherical surfaces are formed on complete spheres or balls. However, because of the limited relative movement of the coupling parts, it is only necessary that each spherical surface have a rolling action of a few degrees in any one direction. Accordingly it is possible, in Figure 1, to eliminate all of the surface of each spherical ball except that small portion of each spherical surface engageable with the coupling members 14, 16, or 22. That is, each spherical ball of Figure 1 may be replaced by a strut having spherical end surfaces, the two end surfaces of each strut forming part of a common sphere. Such a structure is illustrated in Figures 2 to 4.

Referring now to Figures 2 to 4, there is illustrated a flexible coupling comprising forked coupling members 52 and 54. The coupling members 52 and 54 are rotationally rigid with shafts 56 and 58 respectively, which shafts are to be coupled together. The shaft coupling members 52 and 54 are flexibly connected together through a rigid intermediate coupling member 60, said latter member being disposed between the shaft coupling members 52 and 54. The shaft coupling member 52 is provided with a pair of prong-like projecting portions 62 diametrically spaced and axially extending relative to the axis of its shaft. In addition, the shaft coupling member 54 is provided with a pair of diametrically spaced and axially extending projecting portions 64 similar to the projecting portions 62. The projecting portions 62 and 64 are received in the spaces between the corner portions 66 of the intermediate coupling member 60 with the coupling members 62 and 64 disposed on opposite sides of said intermediate coupling member and with the projecting portions 62 of the shaft coupling member 52 rotatively displaced 90° relative to the projecting portions 64 of the shaft coupling member 54.

Each projecting portion 62 of the shaft coupling member 52 is provided with a pair of spaced parallel bores or recesses 68 and 70 extending therethrough. The axes of one pair of bores 68 and 70 define a plane parallel to the corresponding plane defined by the other pair of bores or recesses 68 and 70, said planes being disposed on opposite sides of the coupling axis. The bores 68 and 70 are counterbored to form shoulders 72. Each bore 68 is counterbored from an end opposite to the end from which its adjacent bore 70 is counterbored and opposite to the end from which the other bore 68 is counterbored. A cup-shaped member 74 is received within each bore 68 and 70, said cup-shaped members having annular external flanges 76 engaging the shoulders 72 in their respective bores 68 or 70. The bottom interior surface of each cup-shaped member 74 is flat and is disposed at right angles to the axis of its bore. With this arrangement the flat bottom surfaces of the cup-shaped members 74 are parallel to each other and said bottom surface for each bore 68 faces in a direction opposite to the bottom surface for its adjacent bore 70 and opposite to the bottom surface for the other bore 68.

The shaft coupling member 54 is identical to that of the shaft coupling member 52, said shaft coupling members being rotatively displaced 90° relative to each other. Thus, each projecting portion 64 of the coupling member 54 is provided with a pair of parallel cylindrical bores or recesses 78 and 80 having cup-shaped members 82 closing opposite ends of the bores of each said pair. As illustrated, the cup-shaped members 74 and 82 are similar and the interior bottom surface of the cup-shaped members 82 comprises parallel flat surfaces disposed at right angles to the flat bottom surfaces of the cup-shaped members 74.

The corner portions 66 of the intermediate coupling member 60 are provided with cylindrical bores or recesses 86 and 88 parallel to and facing the open ends of the bores 68 and 70 respectively, in the projecting portions 62 of the shaft coupling member 52. In addition said corner portions are provided with cylindrical bores or recesses 90 and 92 parallel to and facing the bores 78 and 80 respectively, in the projecting portions 64 of the shaft coupling member 54. The ends of the bores 86, 88, 90, and 92 remote from the open ends of their respective facing bores 68, 70, 78 and 80, are closed by cup-shaped members 94 threadedly secured therein. The interior bottom surface of the cup-shaped members 94 are flat and are disposed parallel to the flat bottom interior surfaces of their respective facing cup-shaped members 74 and 82. Elongate spherical-ended struts 96, 98, 100, and 102 are disposed between said parallel flat surfaces as follows: There are two struts 96, each of which is disposed between the facing parallel flat bottom surfaces of a pair of bores 68 and 86. Similarly there are two struts 98, each disposed between the facing parallel flat bottom surfaces of a pair of bores 70 and 88. In addition there are two struts 100, each of said struts being disposed between the facing parallel flat bottom surfaces of a pair of bores 78 and 90, and likewise there are two struts 102, each of said latter struts being disposed between the facing parallel flat bottom surfaces of a pair of bores 80 and 92.

The struts 92, 98, 100, and 102 are identical and the end surface 104 of each strut is spherical with the center of each spherical surface being disposed at the center of its strut. That is, the two spherical end surfaces 104 of each strut form small parts of a common theoretical sphere 105 having a radius equal to ½ the length of its strut, one such sphere being indicated on Figure 3 for one of the struts 98.

In order to permit centering of the projecting portions 62 and 64 between the corner portions 66 of the intermediate coupling member 60 and to permit the coupling to be adjusted to zero backlash, one of the cup-shaped members 94 for the two struts 96 is screwed down against a shoulder 106 while the cup-shaped member 94 for the other strut 96 is adjusted down against said strut. Similarly one cup-shaped member 94 for each of the struts 98, 100, and 102 is adjusted down against a shoulder 106 while the other cup-shaped members 94 for said struts are adjusted down against their respective struts. In this way the projecting portions 62 and 64 can be accurately located between the corner portions 66 of the intermediate coupling member 60 with the ends of each strut 96, 98, 100, and 102 disposed in engagement with the bottoms of their associated recesses with zero backlash therebetween. With this construction and as viewed in the drawing, the spherical ended struts 96 and 98 prevent counter-clockwise and clockwise rotation, respectively, of the shaft coupling member 52 relative to the intermediate coupling member 60. Similarly, the spherical ended struts 100 and 102 prevent clockwise and counter-clockwise rotation, respectively, of the shaft coupling member 54 relative to the intermediate coupling member 60. Accordingly, the coupling is torsionally rigid.

As illustrated, the cross-sectional diameter of the struts 96, 98, 100, and 102 is a maximum at their spherical end surfaces, said maximum diameter being substantially equal to the internal diameter of the cup-shaped members within which the struts are received. Thus each strut tapers to its minimum diameter mid-section thereby providing clearance between said struts and the side walls of their recesses or bores within which said struts are received. This clearance permits limited rolling movement of the spherical ends of each strut on the flat surfaces engaged thereby. In addition, clearance is provided between the projecting portions 62 and 64 and the intermediate coupling member 60 as best seen in Figures 3 and 4. Accordingly, as viewed in Figure 2, the rolling action of the spherical ends of the struts 96 and 98 permits axial movement, lateral horizontal movement, and rotative movement about a vertical axis, of the shaft coupling member 52 relative to the coupling member 60. Similarly, as viewed in Figure 2, the rolling action of the spherical ends of the struts 100 and 102 permits axial and lateral horizontal movement, as well as rotative movement about a horizontal axis, of the shaft coupling member 54 relative to the intermediate coupling member 60. Because of the rolling action of the spherical end surfaces of each strut with the flat parallel surfaces engaged thereby, the clearances, between the shaft coupling portions 62 and 64 and the intermediate coupling member corner portions 66, remain unchanged as the coupling flexes. Therefore, said clearances can be made quite small. Also the pair of facing flat coupling surfaces engaged by the spherical ends of each strut remain parallel to each other as the coupling flexes.

It should now be clear that the structure of Figures 2 to 4 provides the same degrees of freedom between the shafts 56 and 58 as provided by the coupling of Figure 1 between the shafts 10 and 12. However, in the structure of Figures 2 to 4, the spherical end surface of each strut forms part of a sphere having a diameter not much smaller than the diameter of the coupling itself as compared to the relatively small spheres of Figure 1. As previously mentioned, increasing the diameter of the spherical coupling surfaces reduces the magnitude of the contact stresses on the surfaces engaged thereby. The large diameter of the spherical surfaces in Figures 2 to 4 is made possible by the overlapping and the staggered arrangement of each pair of struts 56 and 58 and each pair of struts 60 and 62, and by the fact that said struts extend into recesses in the coupling members 52, 54, and 60. In addition to providing the coupling with spherical surfaces of large diameter, the large depth of the recesses 68, 70, 78, and 80 provides the coupling projecting portions 62 and 64 with a large beam depth and therefore with considerable strength.

Since all the torque transmitted from the shaft 56 to the shaft 58 and vice versa, is transmitted through the spherical end surfaces 104 of the struts 96, 98, 100, and 102, and through the flat surfaces engaged thereby, it is important that there be no sliding between said surfaces. That is, it is important that both spherical ends of each said strut be constrained to rolling action on the flat surfaces engaged thereby. For this purpose, both ends of each strut 96, 98, 100, 102 and the cooperating surfaces in the recesses within which said struts are received, may be modified, from that illustrated in Figures 2 to 4, to prevent relative sliding of their engaged torque transmitting surfaces. Figure 5 illustrates a construction of one end of a strut and its cooperating recess to prevent said relative sliding. The coupling of Figure 5 is like that of Figures 2 to 4 except each end of a strut and its recess is modified as illustrated in Figure 5.

In Figure 5, a cup-shaped member 110 is provided with a flat bottom surface 112 and with an internal conical side wall 114 disposed about said flat bottom surface. One end of an elongate strut 116 extends into said cup-shaped member, there being a similar construction at the other end of said strut. Each strut 116 is also provided with an external annular surface 120 engaging the conical surface 114 of its cup-shaped member 110.

In Figure 5 as in Figures 2 to 4, the two spherical end surfaces 118 of a strut 116 comprise part of a common sphere whereby the radius of each said spherical surface is equal to one-half the length of its strut. In addition, in Figure 5 as in Figures 2 to 4, the coupling torque is transmitted through the spherical end surfaces 118 of the struts and the flat surfaces 112 engaged thereby. Thus, the coupling of Figure 5 is identical with that of Figures 2 to 4 except each of the struts 96, 98, 100, and 102 of Figures 2 to 4 is replaced by a strut 116 and each cup-shaped member 74, 82, and 94 of Figures 2 to 4 is replaced by a cup-shaped member 110. Accordingly the coupling of Figure 5 includes all the features of the coupling of Figures 2 to 4 and in addition each torque transmitting strut is provided with an annular surface 120 adjacent to each of its ends. In addition, the bottom of each strut receiving recess is provided with an annular surface 114 engageable by the annular surface 120 on the end of the strut received within said recess in order to prevent sliding between the associated spherical surface 118 and the flat surface 112 engaged thereby.

The engaging annular surfaces 114 and 120 are such that in an axial plane therethrough, their profiles comprise that of meshing rack and pinion teeth respectively, with the pitch circle of the pinion tooth lying in the spherical end surface 118 of its strut 116 and with the pitch line of the rack lying in the flat bottom surface 112 of its member 110. In Figure 5 the surfaces 114 and 120 have been continued by dot and dash lines 122 and 124 respectively, to complete their tooth profiles only for the purpose of more clearly bringing out the rack and pinion tooth nature of said profiles. Involute rack and pinion teeth have been illustrated in Figure 5. Obviously, however, other rack and pinion tooth profiles may be used.

With the coupling construction of Figure 5, as a spherical end surface 118 of a strut 116 rolls on the flat surface 112 engaged thereby, the surfaces 114 and 120 remain in engagement, said surfaces 114 and 120 moving relative to each other as meshing rack and pinion teeth with the pitch circle of the pinion tooth lying in said spherical end surface 118. Therefore, no sliding can take place between the spherical end surface 118 of each strut and the flat surface 112 engaged thereby, the engaging annular surfaces 114 and 120 constraining said spherical end surface 118 to rolling action of the flat bottom 112 of its recess.

The contact stresses between the annular surfaces 114 and 120 result only from the effect of centrifugal forces on the struts 116, all the coupling torque being transmitted through the spherical ends 118 of the struts 116 and the flat surfaces 112 engaged thereby. Accordingly, the contact stresses between the annular surfaces 114 and 120 are small.

As described, the two torque transmitting spherical end surfaces of each strut of Figures 2 to 4 and of Figure 5 have a common center with a radius equal to one-half the length of the strut. However, the radius of each said spherical end surface may be made somewhat larger than one-half the length of the strut with the center of each said spherical surface disposed on the longitudinal axis of the strut. Then, when the coupling flexes from its un-flexed condition, the rolling action of the struts results in an increase in their effective length thereby elastically loading said struts and providing a slight restoring force tending to return the coupling members to their un-flexed condition.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications.

I claim as my invention:

1. A flexible coupling for a pair of shafts: said coupling comprising first and second members each adapted to be rotationally rigid with one of said shafts; said first and second members each having a pair of diametrically spaced portions on opposite sides of the coupling axis, said pairs of diametrically spaced portions being rotatively displaced 90° relative to each other; each of said portions having a pair of oppositely facing parallel overlapping recesses with the axis of each recess spaced from and disposed at right angles to the coupling axis; a member intermediate said first and second members and having recesses facing said first mentioned recesses; an elongate strut for each pair of facing recesses, each said strut having one end extending into a recess in one of said first and second members and having its other end extending into the facing recess in said intermediate member with said strut overlapping the strut extending into the other recess in the associated one of said portions of said first and second members.

2. A flexible coupling comprising four elongate struts each having a convex spherical surface adjacent to its two ends, said struts being so disposed and having a length such that they substantially form the sides of a square about the coupling axis; first and second coupling members and an intermediate coupling member having projections each containing a pocket providing a flat contact face disposed near the corners of said square, each said contact face engaging an end of one of said struts.

3. A flexible coupling for a pair of shafts comprising a first coupling member arranged for connection to one of said shafts; a second coupling member arranged for connection to the other of said shafts, each of said coupling members having a pair of diametrically spaced projections rotatively displaced 90° relative to the pair of projections of the other coupling member, each of said projections having a pair of oppositely facing parallel overlapping recesses disposed at right angles to the coupling axis and to the diameter on which the projections of its coupling member are disposed; a third coupling member having four projections symmetrically spaced about its axis and between which said first and second member projections are received, said third member projections having recesses facing the recesses in said first and second member projections; each of said recesses extending inwardly from one side of its projection and having a closed bottom adjacent to the opposite side of said projection with said closed bottom including a flat surface disposed parallel to the corresponding flat surface of the facing recess; and a plurality of elongate struts, one for each pair of facing recesses and extending into said recesses, each of said struts having a convex spherical surface adjacent to each of its ends engaging the flat bottom surfaces of the recesses within which said strut is received.

4. A flexible coupling for a pair of shafts comprising a first coupling member arranged for connection to one of said shafts; a second coupling member arranged for connection to the other of said shafts, each said coupling member having a pair of diametrically spaced projections rotatively displaced 90° relative to the pair of projections of the other coupling member and each of said projections having a pair of oppositely-facing laterally-spaced parallel overlapping recesses disposed at right angles to the coupling axis and to the diameter on which the projections of its coupling member are disposed; a third coupling member having four projections symmetrically spaced about its axis and between which said first and second member projections are received, said third member projections having recesses facing the recesses in said first and second member projections; each of said recesses in said members having a flat surface adjacent to its bottom disposed parallel to the corresponding flat surface of its facing recess; and a plurality of elongate struts, one for each pair of facing recesses and extending into said recesses, each of said struts having a convex spherical surface adjacent to each of its ends engaging the flat bottom surfaces of the recesses within which said strut is received.

5. A flexible coupling for a pair of shafts comprising a first coupling member arranged for connection to one of said shafts; a second coupling member arranged for connection to the other of said shafts, each said coupling member having a pair of diametrically spaced projections rotatively displaced 90° relative to the pair of projections of the other coupling member and each of said projections having a pair of oppositely-facing parallel overlapping recesses axially spaced relative to the coupling axis and disposed at right angles to said axis and to the diameter on which the projections of its coupling member are disposed; a third coupling member having four projections symmetrically spaced about its axis and between which said first and second member projections are received, said third member projections having recesses facing the recesses in said first and second member projections; each of said recesses in said members having a flat surface adjacent to its bottom disposed parallel to the corresponding flat surface of its facing recess; and a plurality of elongate struts, one for each pair of facing recesses and extending into said recesses, each of said struts having a convex spherical surface adjacent to each of its ends engaging the flat bottom surfaces of the recesses within which said strut is received.

6. A flexible coupling as recited in claim 3 in which each strut and its pocket have engaging annular surfaces with the profile of one of said surfaces in a plane axial relative to said surfaces being similar to the truncated conical profile of a rack tooth and the corresponding profile of the other of said surfaces being similar to that of a pinion tooth meshing with said rack tooth.

7. A flexible coupling comprising first and second coupling members each having a pair of diametrically spaced projections with each said pair of projections being rotatively displaced 90° relative to the other pair of said projections, each of said projections having a pair of oppositely-facing laterally-spaced parallel overlapping recesses disposed at right angles to the coupling axis and to the diameter on which the projections of its coupling member are disposed; a third coupling member having four projections symmetrically spaced about its axis and between which said first and second member projections are received, said third member projections having recesses facing the recesses in said first and second member projections, each of said recesses having a flat surface disposed adjacent to its bottom and disposed parallel to the corresponding flat surface of its facing recess; and a plurality of elongate struts, one for each pair of facing recesses and extending into said recesses, each of said struts having a convex spherical surface at each end engaging the flat bottom surfaces of the recesses within which said strut is received.

8. A flexible coupling as recited in claim 7 in which the pair of oppositely facing recesses of said first and second member projections overlap to such an extent that the struts extending into said recesses overlap each other along at least half their lengths.

9. A flexible coupling as recited in claim 7 in which the radius of each convex spherical end surface of a strut is at least equal to one-half the distance between convex end surfaces of said strut.

10. A flexible coupling as recited in claim 7 in which the radius of each convex spherical end surface of a strut is larger than one-half the distance between the convex end surfaces of said strut.

11. A flexible coupling comprising first and second coupling members having a pair of diametrically spaced projections with each said pair of projections being rotatively displaced 90° relative to the other pair of said projections, each of said projections having a pair of first and second oppositely-facing parallel recesses with the first recesses of each pair being disposed in a plane transverse to the coupling axis and axially spaced along said axis from the corresponding plane of the second recesses of each pair; a third coupling member having four projections symmetrically spaced about said axis and between which said first and second member projections are received, said third member projections having recesses facing the recesses in the first and second member projections, each of said first, second and third member recesses having a flat surface disposed adjacent to its bottom and disposed parallel to the corresponding flat surface of its facing recess; and first and second sets of four elongate struts respectively disposed in said first and second planes with the four struts of each set being disposed about said axis so as substantially to form the sides of a square, each said strut having a convex spherical surface at its two ends and extending into a recess in one of said first and second members and into the facing recess of said third member with the spherical ends of said strut engaging the flat bottom surfaces of said recesses.

ROLAND CHILTON.

REFERENCES CITED

The following references are of record in the file of this patent:

UNITED STATES PATENTS

| Number | Name | Date |
|---|---|---|
| 1,493,232 | Barton | May 6, 1924 |
| 1,499,618 | Kasley | July 1, 1924 |
| 1,648,078 | Thomsen | Nov. 8, 1927 |
| 1,734,043 | Nelson | Nov. 5, 1929 |

FOREIGN PATENTS

| Number | Country | Date |
|---|---|---|
| 321,077 | Great Britain | 1929 |